United States Patent Office 3,839,584
Patented Oct. 1, 1974

1

3,839,584
PHARMACEUTICAL COMPOSITIONS CONTAINING A NOVEL ESTER OF [(METHYLAMINO) METHYL]BENZYL ALCOHOL AND METHODS OF USING SAME
Anwar Hussain and James E. Truelove, Lawrence, Kans., assignors to Interx Research Corporation, Lawrence, Kans.
No Drawing. Original application Aug. 31, 1972, Ser. No. 285,235, now Patent No. 3,809,714. Divided and this application Nov. 16, 1973, Ser. No. 416,605
Int. Cl. A61k 27/00
U.S. Cl. 424—311                             6 Claims

ABSTRACT OF THE DISCLOSURE

A novel ester of the general formula:

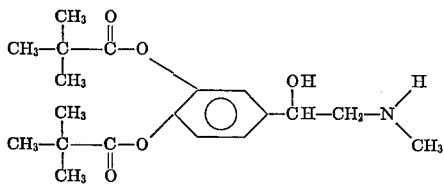

and the pharmaceutically acceptable acid condition salts thereof. The compound of the formula is useful as an antiglaucoma and broncholytic agent.

CROSS-REFERENCE TO RELATED APPLICATIONS

This Application is a divisional application of our earlier co-pending application, Ser. No. 285,235, filed on Aug. 31, 1972, now U.S. Pat. 3,809,714.

BACKGROUND OF THE INVENTION

The present invention relates to both a novel and useful therapeutic ester of benzyl alcohol and to pharmaceutical compositions for using same. More particularly, the invention pertains to a new compound represented by Formula 1 of the following general formula:

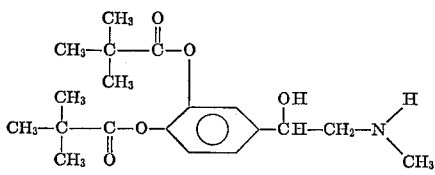

Formula 1 and its pharmaceutically acceptable, non-toxic acid addition salts. The compound and its salts are useful as astiglaucoma and broncholytic agents, and they can be administered per se or in pharmaceutical composition form when admixed with a pharmaceutically acceptable carrier.

A pharmaceutical and medical need exists for a new and useful compound indicated for the management of glaucoma, bronchial asthma and other sympathomimetic activities. This need exists because the compound 3,4-dihydroxy-α-[(methylamino)methyl]benzyl alcohol, generally known as epinephrine, and widely used for the treatment of these medical conditions, possesses certain inherent disadvantages. For example, one disadvantage associated with the prior art compound is its instability to both air and light and it is subject to chemical attack by many agents that are conventionally used in pharmaceutical preparations. Past attempts by the prior art to overcome these particular disadvantages have not met with any acceptable success. One attempt involved acidifying solutions containing the drug which solutions were irritating to body tissue, and if these solutions later were adjusted to a physiological pH, the free drug frequently precipitated and deterioration followed. One attempt to protect the drug against oxidative deterioration consists in adding the antioxidant sodium bisulfite to a solution containing the drug. But, this anti-oxidant chemically attacked the aliphatic side chain of the drug to form a biologically inactive derivative thereof. Also, the prior art 3,4-dihydroxy-α-[(methylamino)methyl]benzyl alcohol had poor lipoid solubility attributed to its hydrophilic phenolic hydroxyl groups which tended to restrict the medical application of the drug. This common and wide use of 3,4-dihydroxy-α-[(methylamino)methyl]benzyl alcohol with their accompanying disadvantages creates an immediate and pressing need for a new and useful pharmaceutical compound that possesses therapeutic properties useful for treating bronchial asthma, glaucoma and the like while remaining essentially free from the unwanted disadvantages associated with the prior art compounds.

SUMMARY OF THE INVENTION

Accordingly, it is an immediate object of this invention to provide a novel pharmaceutical compound and its acceptable acid addition salts that are useful as an antiglaucoma agent, for treating bronchial asthma and as a sympathomimetic agent.

Another object of the invention is to provide a novel and useful physicochemical ester of 3,4-dihydroxy-α-[(methylamino)methyl]benzyl alcohol and its acceptable salts that are essentially free from the unwanted effects associated with the prior art.

Still another object of the invention is to provide a new and useful 3,4-dipivalyl-α-[(methylamino)methyl] benzyl alcohol that possesses increased stability and solubility and can be administered in standard, pharmaceutical formulations.

Yet still another object of the invention is to provide the compound 3,4 - dipivalyl-α-[(methylamino)methyl] benzyl alcohol as a useful therapeutic agent that has improved lipoid solubility for enhanced resorption when administered to warm blooded animal tissue.

Yet still another object of the invention is to provide 3,4-dipivalyl-α-[(methylamino)methyl]benzyl alcohol that can be administered per se or can be dispensed in ophthalmic, aerosol and other types of pharmaceutical formulations to warm blooded animals to produce a local or systemic physiological or pharmacological beneficial effect.

Other objects, features and advantages of the invention will be apparent to those skilled in the art from the detailed description of the invention which follows, taken in conjunction with the accompanying claims.

DETAILED DESCRIPTION OF INVENTIVE EMBODIMENTS

In attaining the objects, features and advantages of the present invention, it has now been found that the compound embraced by Formula 1

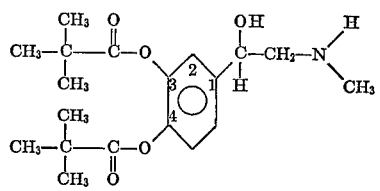

Formula 1 and its pharmaceutically acceptable salts can be made available to the art for use as an antiglaucoma agent, for use in the management of bronchial asthma, and for use as a general sympathomimetic agent that acts on postganglionic adrenergic nerve ending structures innervated by them and possessing and enhanced rate of absorption while simultaneously overcoming the problems associated with the prior art can be synthesized by the now described procedures.

The novel 3,4-dipivalyl - α - [(methylamino)methyl]-benzyl alcohol of Formula 1, which can also be conveniently named 1-(3,4 - dipivalylphenyl)-2-(methylamino) ethanol or 3,4-dipivalyl-1-[1-hydroxy - 2 - (methylamino) ethyl]benzene is prepared by first contacting and reacting an α-halo-3,4-dihydroxyacetophenone with stoichiometric amounts, usually with an excess of a lower alkylamine; for example, with about 1 to about 30 or more molecular equivalents of the alkylamine for each reactive halogen moiety present in the α-halo-3,4-dihydroxyacetophenone present as a reactant. The reaction is carried out in the presence of a suitable solvent, at a temperature of about 10° C. to about 75° C., usually at ambient temperature of about 25° C., and at atmospheric pressure, or higher pressures of from 1 to about 10 atmospheres and the like. The standing reactants begin to react on contact, but it is generally preferable to carry out the reaction for about 10 minutes to about 48 hours to produce from the starting materials the corresponding product, α-lower alkylamino-3,4-dihydroxyacetophenone.

Next, the hydroxyl groups of the product α-lower-3,4-dihydroxyacetophenone at positions C–3 and C–4 of the aryl ring are esterified by reacting an acylating agent with the hydroxyl group in an organic medium. Examples of acylating agents suitable for esterifying the hydroxyl groups include anhydrides, mixed anhydrides, the chloride of the appropriate alkanoic acid, and the like. The acylation is carried out by contacting and reacting the hydroxyl groups with, for example, an acid chloride pivalyl chloride, in the presence of a solvent, at a temperature of 5° C. to 100° C., usually at refluxing temperature, and at a pressure of 1 atmosphere or higher, for about 2 hours to 24 hours or longer. Generally, the reactants are present in equivalent amounts, or in excess thereof, for example, 1 to 10 moles of acid chloride to 1 mole of hydroxyl reactant. The acylated product is recovered by precipitating with an organic solvent, followed by conventional organic extraction and reprecipitation with an aqueous media to yield the product, α-lower alkylamino-3,4-dipivalyl acetophenone.

The aliphatic side chain keto functionality is conveniently reduced to the corresponding alcohol group very smoothly and in good yield by the catalytic hydrogenation of the α-lower alkylamino-3,4-dipivalyl acetophenone. Generally, the hydrogenation is carried out in the presence of a nobel metal catalyst such as platinum, palladium, rhodium, platinium oxide and the like. The reduction of the ketone in a hydrogen environment, usually 20 atmospheres to 180 atmospheres and the like, and at room temperatures, or with heating from about 20° C. to 75° C. or the like. The catalytic hydrogenation is usually carried out in a standard Parr vessel, or the like. The carbonyl can also be reduced by standard methods such as metal hydride reduction, and the like. *Modern Synthetic Reactions,* by House, H. O., pp. 1 to 22, 1965, published by W. A. Benjamin, Inc., New York.

The resolution of the racemate can be carried out by conventional standard resolution methods well known to those in the art as described in *Organic Chemistry*, by Fieser and Fieser, pp. 270 to 281, 1944, published by D.C. Heath and Company, Boston; and, *Organic Chemistry*, by Morrison and Boyd, pp. 231 to 233, 1969, published by Allyn and Bacon, Inc., Boston.

The phrases, "pharmaceutically acceptable" and "non-toxic, acid addition salts" as used herein generally includes the non-toxic acid addition salts of the compounds of Formula 1, formed with non-toxic inorganic or organic acids. For example, the salts include those derived from inorganic acids such as hydrochloric, hydrobromic, sulfuric, sulfamic, phosphoric, nitric and the like; and the salts prepared from organic acids such as acetic, propionic, succinic, glycollic, stearic, lactic, malic, tartaric, citric, ascorbic, pamoic, maleic, hydroxymaleic, phenylacetic, glutamic, benzoic, salicyclic, sulfanilic, fumaric, salicylic, toluenesulfonic, and the like.

The pharmaceutically acceptable acid addition salts of the present invention can be synthesized from the compound embraced by Formula 1 by conventional, chemical methods. Generally, the salts are prepared by reacting the free base with stoichiometric amounts or with an excess thereof of the desired salt forming inorganic or organic acid in a suitable solvent or various combination of solvents. For example, the free base can be dissolved in a mixed aqueous solution of the appropriate acid and the salt recovered by standard techniques, for example, by evaporation of the solution. Alternatively, the free base can be charged into an organic solvent such as a lower alkanol, a symmetrical or unsymmetrical ether containing 2 to 10 carbon atoms, an alkyl ester, or mixtures thereof, and the like, and then it is treated with the appropriate acid to form the corresponding salt. The salt is recovered by standard, recovery techniques, for example, by filtration of the desired salt on spontaneous separation from the solution, or it can be precipitated by the addition of a solvent in which the salt is insoluble and recovered therefrom.

Examples of suitable inorganic and organic solvents for performing the various reactions include any inorganic or organic solvent that does not adversely effect the reactants or the resulting product including halogenated solvents such as methylene chloride, chloroform, carbon tetrachloride, ethylene chloride, ether solvents such as diethyl ether, dimethyl ether, and other solvents such as tetrahydrofuran, dioxane, diglyme, n-hexane, cyclooctane, benzene, heptane, cyclohexane; mixtures thereof, and like aliphatic, cycloaliphatic and aromatic hydrocarbon solvents, water, acidified aqueous solutions, mixed organic and inorganic solutions, ethyl acetate, propyl acetate, and the like.

The following examples are set forth as representative methods illustrative of the spirit of the present invention. These examples are not to be construed as limiting the scope of the invention as other functionally equivalent means will be readily apparent to those skilled in the subject art in the light of the present specification and the accompanying claims.

EXAMPLE 1

Synthesis of 3,4-dipavalyl-α-[(methylamino)methyl]-benzyl alcohol. First, 0.27 moles of α-chloro-3′,4′-dihydroxyacetophenone, Formula 2, are dissolved in 200 ml. methanol with warming. Next, one hundred ml. of a 40% aqueous solution of methylamine is slowly added and the mixture stirred at 50–55° C. for two hours. The reaction mixture is then stirred an additional 24 hours at room temperature.

The crude product separates as a solid from the reaction medium and is recovered by filtration, and it is then washed thoroughly with ether and dissolved in 350 ml. 1N HCl. Then, approximately 250 ml. of the aqueous solvent is removed with a rotary evaporator and the evaporation residue combined with 125 ml. methanol and filtered through decolorizing charcoal. The product, Formula 3, is precipitated as the HCl salt by the addition of seven parts of acetone. The resulting crystalline material is removed by filtration dried at 40° C. with vacuum, and has a melting point of about 242° C. and is used without further purification.

Next, 25.3 grams, 0.125 mole, of compound 3 are dissolved in 250 ml. ethyl acetate and 0.125 moles perchloric acid as a 70% aqueous solution is slowly added thereto with continuous stirring. Then, an excess of pivalyl chloride, Formula 4, 280 ml., is added and the mixture slowly warmed to reflux temperature. The reaction mixture is refluxed for about five hours and allowed to cool to room temperature with continuous stirring. The product is precipitated as the perchlorate salt by the addition of perchloric acid, HClO₄, in 500 ml. ether. The product, Formula 5, is isolated and purified by dissolving in 75 ml. acetone and precipitating it with 150 to 200 ml. of water.

To 20 grams of compound of Formula 5 dissolved in 300 ml. 95% ethanol in a Parr reaction vessel is added 1.5 grams Adams catalyst, platinum dioxide, and the mixture shaken under hydrogen at 50 p.s.i. for one hour at ambient temperature. The mixture is then filtered and the ethanol removed on a standard rotary evaporator. The resulting oil is dissolved in 200 ml. ether and slowly added to 1200 ml. ether with continuous stirring. The product, Formula 6, separates as crystals which are removed after 15–30 minutes by filtration. The compound melts at 146–147° C. and needs no further purification.

The racemate, Formula 6, is resolved by fractional crystallization of the dibenzoyl-*d*-bitartrate salt as follows: first, 8.4 grams of sodium dibenzoyl-d-bitartrate. Formula 7, are dissolved in 200 ml. methanol and the solution filtered. Next, 20 grams of compound 6 are dissolved in 200 ml. methanol, filtered and diluted with 400 ml. water. The solution of the sodium dibenzoyl-d-bitartrate is added to the aqueous methanol solution of 5 and the total volume adjusted to 840 ml. with a 1 to 1 mixture of methanol and water. This solution is seeded with known dibenzoyl-bitartrate salt of *l*-dipivalylepinephrine, Formula 8, and cooled at a rate of 0.8 degrees per hour until the final temperature is 2.6° C. The product, Formula 8, is removed by filtration and recrystallized from 1 to 1 methanol/water by the procedure above. The product has a melting point of 149–150° C. and a specific rotation of about −25°. This sequence is outlined below:

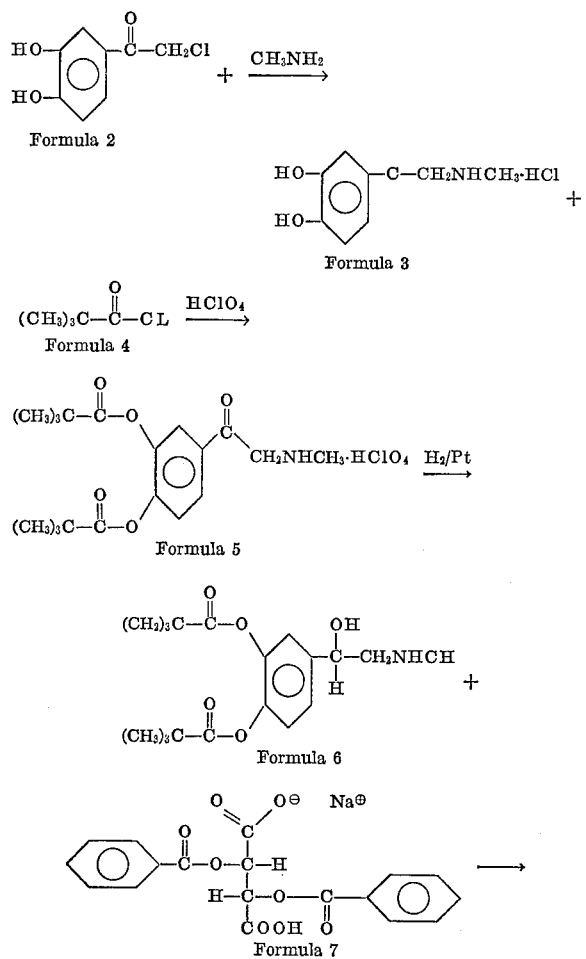

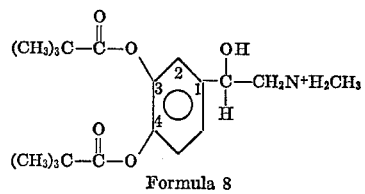

Formula 8

EXAMPLE 2

The reaction procedure of Example 1 leading to 3,4-dipivalyl-α-[(methylamino)methyl]benzyl alcohol can also be carried out by optionally starting with commercially available catechol, Formula 9 below, reacting it with stoichiometric amounts, usually a slight excess of chloroacetyl catechol, Formula 11. The intermediate chloroacetyl catechol is then reacted with methylamine $NH_2CH_3$, Formula 12, and the reaction then is carried through the remaining procedure of Example 1 to give the product. The starting reaction of Example 2 is as follows:

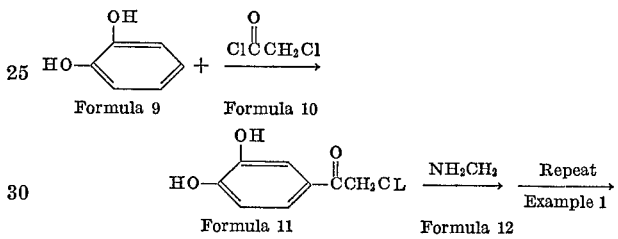

The novel compound and its pharmaceutically acceptable salts can be used by the pharmaceutical and the veterinary arts for their antiglaucoma, treating bronchial asthma including hay fever and allergic rhinitis in a variety of pharmaceutical preparations or veterinary preparations. In these preparations, the new compound and its non-toxic salts are administrable in the form of injectables, solutions, suppositories, ointment, emulsions, jellies, buccal patches, oral inhalant, nasal inhalant, aerosol, and in other suitable forms. The pharmaceutical or veterinary preparation which contains the compound is conveniently admixed with a non-toxic pharmaceutical organic carrier, or with a non-toxic pharmaceutical inorganic carrier, usually from 0.1 micrograms to 10 grams, and the like. Typical of pharmaceutically acceptable carriers are, for example, water, mixtures of water and water-miscible solvents such as lower alkanols or aralkanols, vegetable oils, polyalkylene glycols, petroleum based jelly, ethyl celluose, ethyl oleate, carboxymethylcellulose, polyvinylpyrrolidone, isopropyl myristate and other conventionally employed acceptable carriers. The pharmaceutical preparation may also contain non-toxic auxiliary substances such as emulsifying, preserving, wetting agents, bodying agents and the like, as for example, polyethylene glycols 200, 300, 400 and 600, carbowaxes 1,000, 1,500, 4,000 and 10,000, bacterial components such as quaternary ammonium compounds, phenylmercuric salts known to have cold sterilizing properties and which are non-injurious in use, thimerosal, propyl paraben, buffering ingredients such as sodium chloride, sodium borate, sodium acetate, gluconate buffers, and other conventional ingredients such as sorbitan monolaurate, triethanolamine oleate, polyoxyethylene sorbitan monopalmitylate, dioctyl sodium sulfosuccinate, monothioglycerol, thiosorbitol, ethylenediamine tetracetic acid, and the like. Additionally, suitable ophthalmic vehicles can be used as carrier media for the present purpose including conventional phosphate buffer vehicle systems, isotonic boric acid vehicles, isotonic sodium chloride vehicles, isotonic sodium borate vehicles, and the like.

Exemplary of a typical method for preparing an ophthalmic composition containing L - 3,4 - dipivalyl-α - [(methylamino)methyl]benzyl alcohol salt, sodium chloride, chlorobutanol, oxime sulfate and distilled water is as follows: first a measured quantity of chlorobutanol is dissolved in 500 milliliters of distilled water with stirring and optionally using gentle heat to form a solution. Then, sodium chloride, oxime sulfate and L - 3,4 - dipivalyl-α - [(methylamino)methyl]benzyl alcohol bitartrate is added and the solution stirred until clear. Next, distilled water is added to the liter mark and the ophthalmic solution filtered through a conventional filter having a 0.2 to 0.4 micron pore size. The solution will have a shelf-life stability of 3 years at 4° C. and its composition form is as follows:

| Ingredients: | Per liter, gm. |
|---|---|
| L - 3,4 - dipivalyl - α - [(methylamino)methyl] benzyl alcohol bitartrate | 2.0 |
| Sodium chloride | 8.0 |
| Chlorobutanol | 5.0 |
| Oxime sulfate | 0.1 |
| Distilled water | qs. 1 liter |

A second pharmaceutical formulation similar to the formulation prepared immediately above is made by following that procedure except that the amount of L-3,4-dipivalyl-α-[(methylamino)methyl]benzyl alcohol bitartrate is increased to 10 grams and 2% phenylethyl alcohol is used as the preservative.

A novel lyophilized pharmaceutical preparation for subsequent reconstitution immediately before therapeutic administration is prepared as follows: first, 4 grams of L - 3,4-dipivalyl-α-[(methylamino)methyl]benzyl alcohol bitartrate and 8 grams of mannitol U.S.P. are mixed with agitation into 1 liter of distilled water and the solution formed filtered through a sterile filter. Then, 5 cc. to 12 cc. of the solution is transferred to amber vials and lyophilized by conventional methods until the freshly forming cake is dry. The lyophilized, dry cake is reconstituted with 10 cc. of a diluent containing the following: 2 grams sodium chloride, 5 grams of chlorobutanol, 0.1 gram of oxime sulfate, mixed with distilled water to the volume line in a 100 milliliter volumetric flask.

The lyophilized cake can optionally be prepared by replacing the mannitol with buffering agents such as a mixture of sodium chloride and sodium dihydrogen phosphate, or a mixture of potassium chloride and either potassium acetate or sodium acetate.

Exemplary of formulations suitable for inhalation therapy include those formulations that can be administered from nebulizers of the squeeze-bulb, reservoir. Venturi effect assembly, pressurized dispensers using chlorofluoro - hydrocarbon propellants, pre - micronized powders in liquid propellants, liquid-vapor phase aerosols, and the like. Typically, the formulation suitable for a conventional nebulizer optionally is comprised of 0.4 to 0.8% solution of L - 3,4 - dipivalyl-α-[(methylamino) methyl]benzyl alcohol hydrogen chloride in a buffered carrier comprised of sodium chloride, sodium citrate, glycerine and a trace of preservative. In one embodiment the air in the dispenser can be displaced with nitrogen gas. A typical pressurized dispenser can optionally be 0.20 to 0.50% on a weight by weight basis of L-3,4-dipivalyl-α-[(methylamino)methyl]benzyl alcohol in a mixture of dichlorodifluoromethane and dichlorotetrafluoroethane with a sodium lactate lactic acid buffer, about 30 to 40% weight by weight of an alkanol and aromatic flavoring agents. Other formulations containing the compound of the invention suspended in fluorochlorocarbons containing sorbitan trioleate and the like can also be used for administering the compound.

The dose administered, whether a single dose or a daily dose, will, of course, vary because of the chosen route of administration, and the size of the recipient. The dosage administered is not subject to definite bounds, but it will usually be an effective amount, or the equivalent on a molar basis of the pharmacologically active form produced upon the metabolic release of the active drug to achieve its desired pharmacological and physiological effect. The medical dose for warm blooded mammals, including humans and primates by the intramuscular or subcutaneous route will be about 100 micrograms to 5 milligrams administered in 0.1 to 1.5 ml. of a 0.1 to 0.5 oil suspension, with the usual intramuscular dose of 200 to 750 micrograms in 0.2 to 0.75 ml. of a 0.1 to 0.5% solution. For oral inhalation the dose is about 0.01 to 2.0% applied as a fine mist. For typical application in operative procedures on the nose and throat, solutions of 0.002 to 0.975% may be used. Generally, the dosage form for a typical non-toxic salt, for example, the bitartrate in an ophthalmic solution will be about 0.025 to 4% and the like. The dose for farm animals is generally about 4 to 10 ml. by the subcutaneous or intramuscular route for horses and cattle and for dogs about 0.2 to 0.6 ml. and the like.

The unexpected, pronounced pharmacological properties for the compound of the invention and its non-toxic salts are demonstrated by using standard art known testing procedures. For example, the mydriatic effect of the compound, which is useful for lowering intraocular pressure usually associated with antiglaucoma, is observed for the compound in a group of rabbits by administering the active compound to their eyes and observing the effects 20 minutes later. The test is carried out by applying a 0.1% weight by volume isotonic saline solution L-3,4-dipivalyl-α-[(methylamino)methyl]benzyl alcohol bitartrate to the eyes of a mixed colony of New Zealand white rabbits and the eyes of the animals observed using the eyes of similar rabbits treated with non-acylated and other acylated compounds as a control. The observed results indicated no mydriasis for L-3,4-dihydroxy-α-[(methylamino)methyl]benzyl alcohol bitartrate, no mydriasis for L-3,4-diacetyl-α-[(methylamino)methyl]-benzyl alcohol hydroperchlorate, marginal mydriasis for L-3,4 - dipropionyl-α-[(methylamino)methyl]benzyl alcohol hydroperchlorate, marginal mydriasis for L-3,4-diisobutynyl-α-[(methylamino)methyl]benzyl alcohol hydroperchlorate, and extensive mydriasis for L-3,4-dipivalyl - α-[(methylamino)methyl]benzyl alcohol hydroperchlorate.

The anti-asthmatic effects of the compound of the invention is demonstrated as follows: first, adult, male guinea pigs are exposed to the nebulized spray of a 0.2% weight by volume spray of L-3,4-dihydroxy-α-[(methylamino)methyl]benzyl alcohol equivalent in saline solution for 2 minutes in an inhalation chamber. With the control animals, only saline solution is nebulized. Next, the animals are exposed to a histamine challenge 10 minutes after exposure to the various tested compounds. The histamine challenge consists in exposing the animals to the spray of a 0.2% weight by volume histamine diphosphate solution, and then recording the time before the onset of the first seizure. All the compounds were tested on an L-3,4 - dihydroxy-α-[(methylamino)methyl]benzyl alcohol basis, and the observed times are set forth in Table 1.

TABLE 1

| Compound: | Delay Before Onset Of Seizure in Minutes |
|---|---|
| Control | 1-2 |
| L-3-4-dihydroxy-α - [(methylamino)methyl] benzyl alcohol bitartrate | 5.5 |
| L-3,4-diacetyl - α - [(methylamino)methyl] benzyl alcohol hydroperchlorate | 4 |
| L-3,4-dipropionyl-α - [(methylamino)methyl] benzyl alcohol hydroperchlorate | 5 |
| L-3,4-diisobutyryl-α- [(methylamino)methyl] benzyl alcohol hydroperchlorate | 5 |
| L-3,4-dipivalyl - α - [(methylamino)methyl) benzyl alcohol hydroperchlorate | 8-10 |

The enhanced stability of the compound is ascertained and compared against other compounds by measuring its rate of hydrolysis in a pH 4.5 acetate buffer solution at room temperature and expressing the results as $t_{1/2}$ days. The test solutions had a concentration of 0.5 milligrams per milliliter, and the rate of hydrolysis was measured in a spectrophotometer at 280 m$\mu$. The results are set forth in Table 2. Also in the same table is set forth the rate of auto-oxidation of a 0.2% solution at a pH of 4 in an air oxidative environment. These results are set forth as the time for color formation, pink to brown, to develop in days from the first exposure of the solution to the environment.

TABLE 2

| Compound | Hydrolysis, $t_{1/2}$ | Oxidation, days |
|---|---|---|
| L-3,4-dihydroxy-α-[(methylamino)methyl]-benzyl alcohol bitartrate | | 20 |
| L-3,4-diacetyl-α-[(methylamino)methyl]benzyl alcohol hydroperchlorate | 30 | 15 |
| L-3,4-dipropionyl-α-[(methylamino)methyl]benzyl alcohol hydroperchlorate | 34 | 35 |
| L-3,4-diisobutyryl-α-[(methylamino)methyl]benzyl alcohol hydroperchlorate | 50 | 35 |
| L-3,4-dipivalyl-α-[(methylamino)methyl]-benzyl alcohol hydroperchlorate | 700 | 300 |

The improved stability of the compound is demonstrated in various biological media by measuring its enzymatic rate of hydrolysis in various media at 37° C. and expressing this result as the $t_{1/2}$ life. The enzymatic rate of hydrolysis is measured at pH of about 7.5 and at a concentration of 0.5 mg./ml. of compound in media (a) horse serum cholinesterase, (b) rabbit serum, and (c) human plasma. The results for the compound are listed in Table 3, as are the results of other compounds treated in a like enzymatic environment. The free base compound was measured by using high pressure liquid chromatography.

TABLE 3

| Compound | Rate of hydrolysis in $t_{1/2}$ seconds | | |
|---|---|---|---|
| | Horse | Rabbit | Human |
| L-3,4-diacetyl-α-[(methylamino)methyl]-benzyl alcohol hydroperchlorate | 20 | 45 | 180 |
| L-3,4-dipropionyl-α-[(methylamino)-methyl]benzyl alcohol hydroperchlorate | 50 | 90 | 240 |
| L-3,4-dibutyryl-α-[(methylamino)-methyl]benzyl alcohol hydroperchlorate | 100 | 160 | 360 |
| L-3,4-dipivalyl-α-[(methylamino)-methyl]benzyl alcohol hydroperchlorate | 600 | 720 | 1,800 |

The above examples and disclosure are set forth merely for illustrating the mode and the manner of the invention. And, while various modifications and embodiments can be made by those skilled in the art, in the light of this invention, they are made without departing from the spirit of the invention.

What is claimed is:

1. A pharmaceutical composition comprising a pharmaceutically effective amount of a member selected from the group consisting of 3,4-dipivalyl-α-[(methylamino)methyl]benzyl alcohol and its therapeutically acceptable acid addition salts, admixed with a pharmaceutically acceptable carrier.

2. A pharmaceutical composition according to claim 1 wherein the pharmaceutically effective amount consists of from 0.1 micrograms to 10 grams of 3,4 - dipivalyl-α-[(methylamino)methyl]benzyl alcohol admixed with a pharmaceutically acceptable carrier.

3. A pharmaceutical composition according to claim 1 wherein the composition consists of 0.01% to 2% of 3,4-dipivalyl - α - [(methylamino)methyl]benzyl alcohol and the carrier is a therapeutically acceptable inhalation carrier.

4. A pharmaceutical composition according to claim 1 wherein the composition consists of 0.25% to 4% of 3,4-dipivalyl - α - [(methylamino)methyl]benzyl alcohol and the carrier is a therapeutically acceptable opthalmic carrier.

5. A method for lowering intraocular pressure which method comprises applying topically to the eye an effective amount of composition comprising a topical opthalmic vehicle and 0.01 to 0.2% of a member selected from the group consisting of 3,4 - dipivalyl - α - [(methylamino)methyl]benzyl alcohol and a non-toxic acid addition salt thereof for lowering the intraocular pressure.

6. A method for relieving asthma in a warm blooded animal which method comprises administering an inhalation composition comprising an inhalation vehicle and 0.01 to 2% of a member selected from the group consisting of 3,4 - dipivalyl - α - [(methylamino)methyl] benzyl alcohol, and a non-toxic acid addition salt thereof for relieving asthma.

References Cited

Minatoya—Chem. Abst., vol. 74 (1971), p. 53268c.

SAM ROSEN, Primary Examiner